United States Patent Office 3,284,721
Patented Nov. 8, 1966

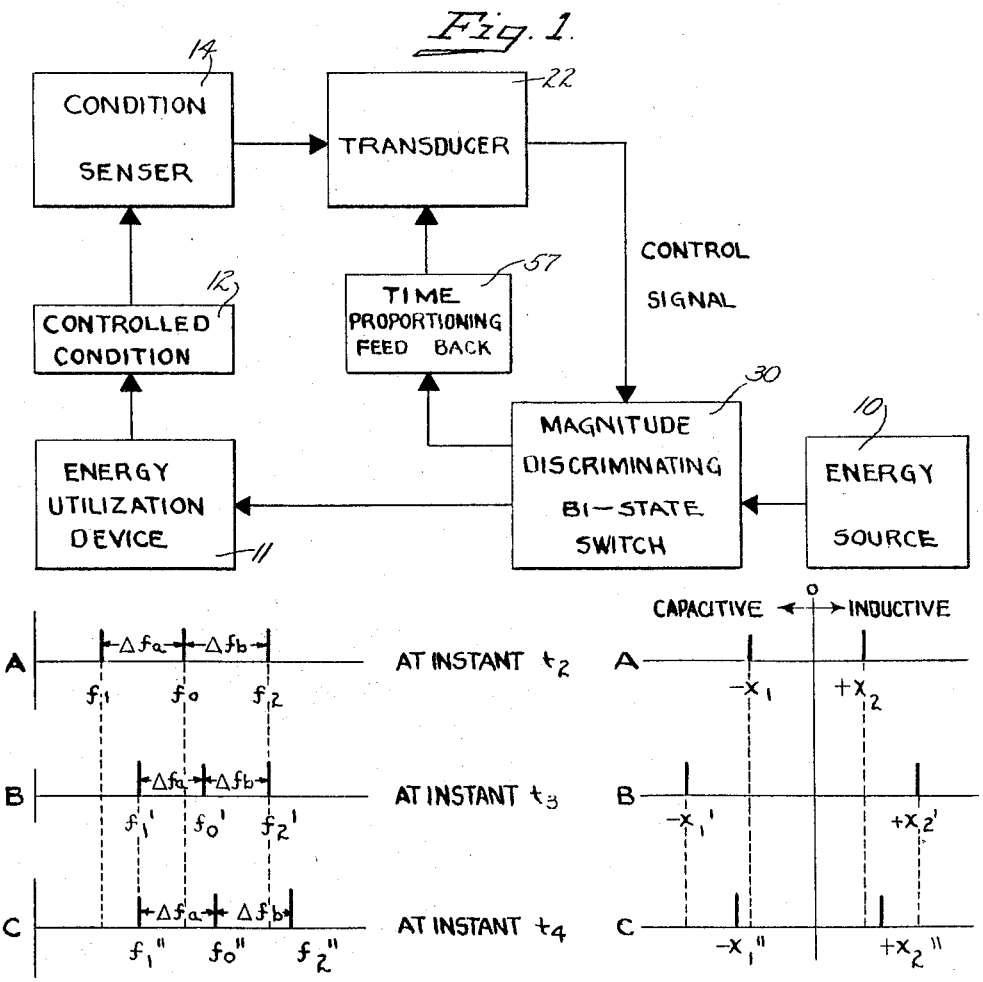
Fig. 1.
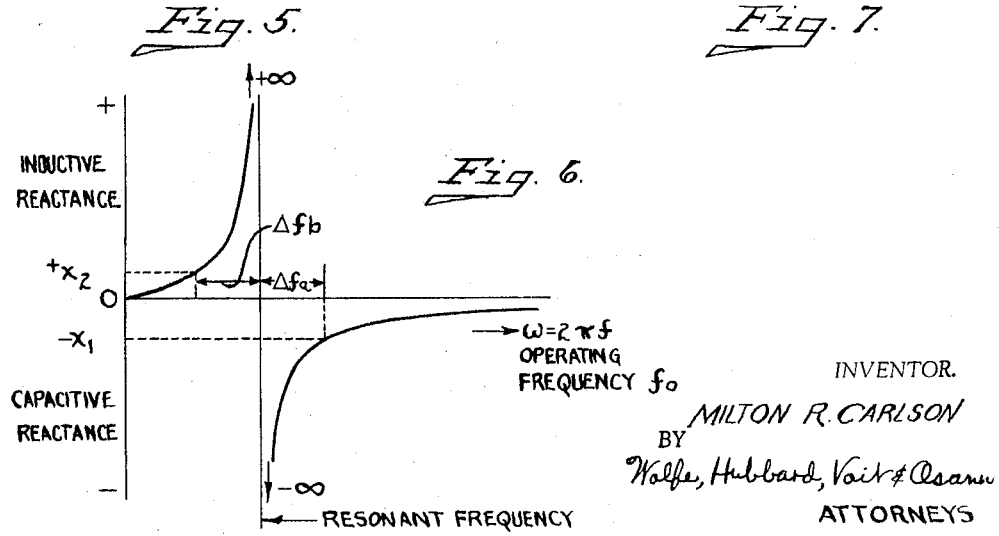
Fig. 5.  Fig. 7.
Fig. 6.
INVENTOR.
MILTON R. CARLSON
BY
Wolfe, Hubbard, Voit & Osann
ATTORNEYS

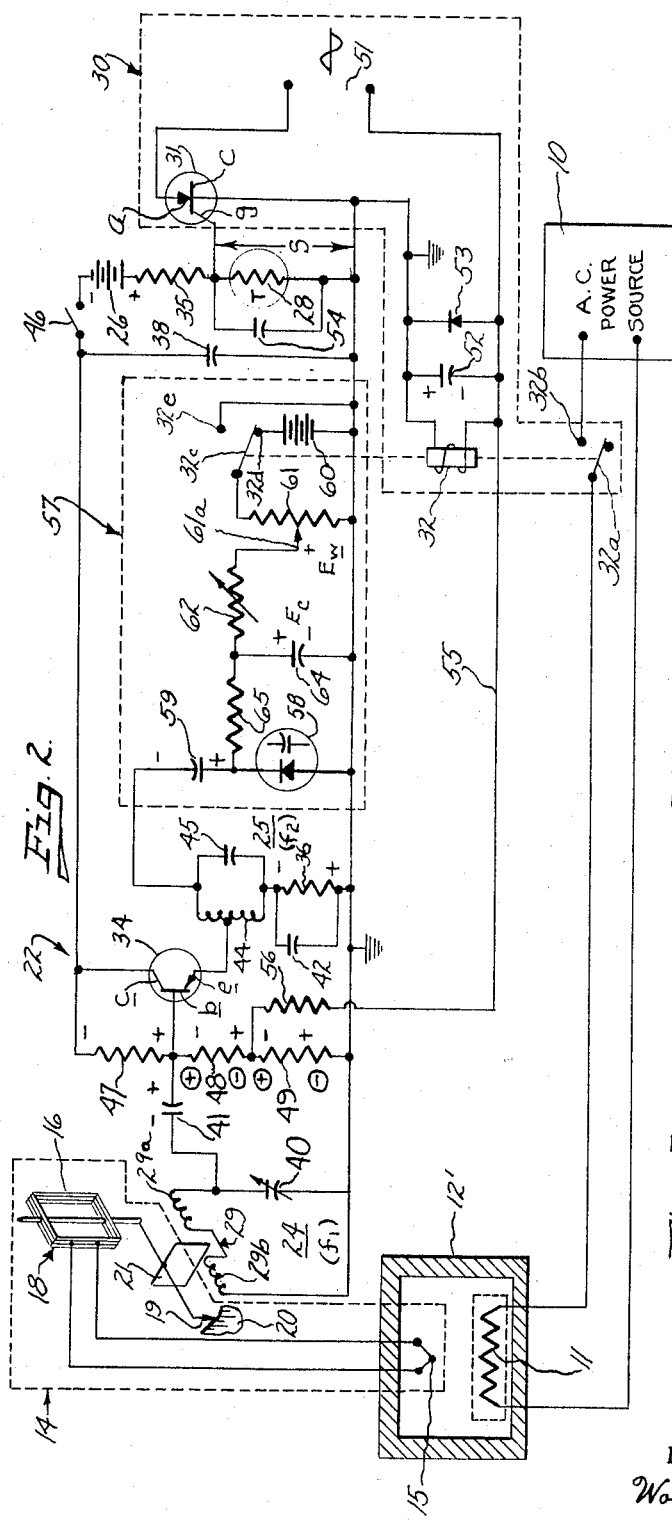

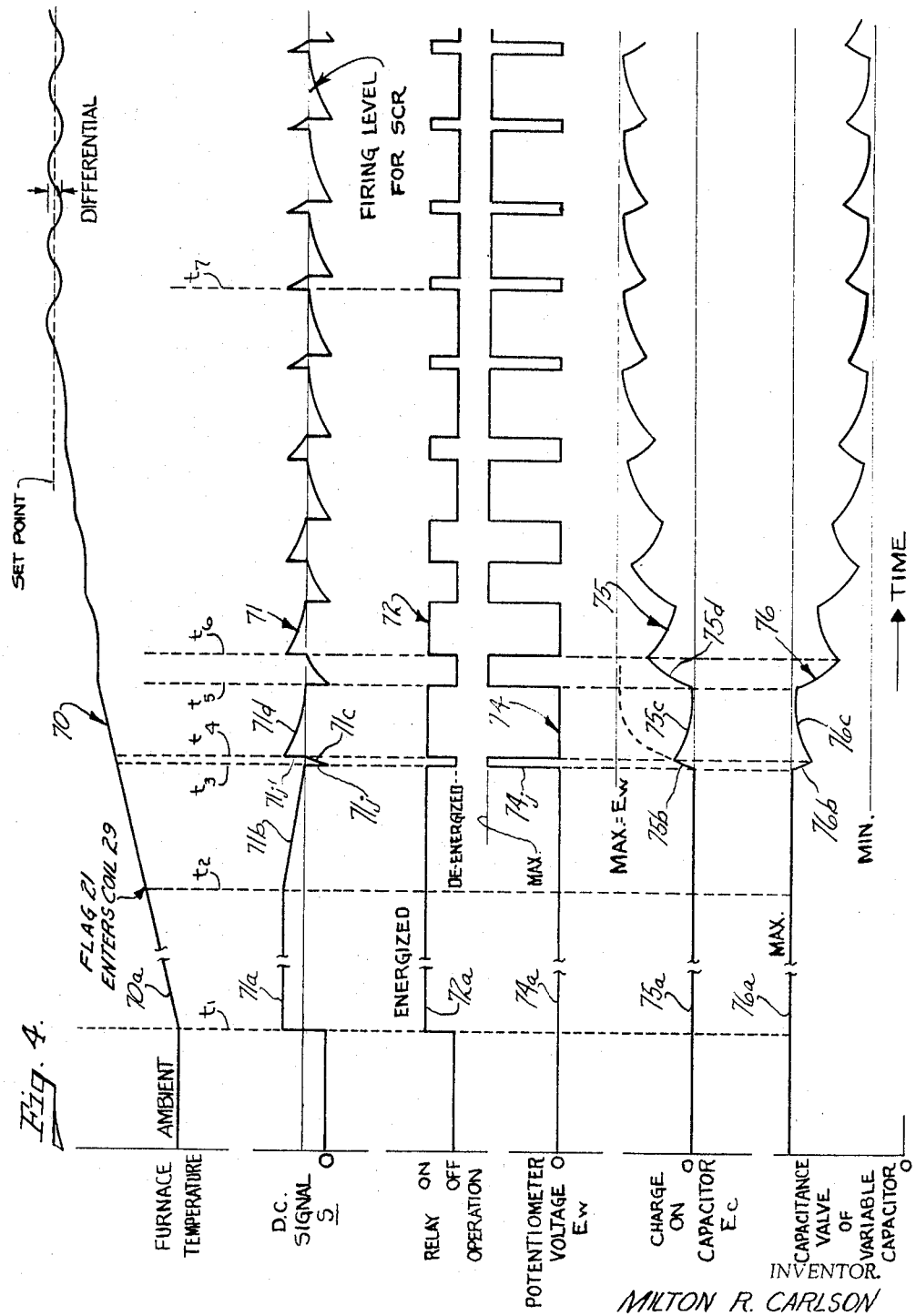

3,284,721
OSCILLATOR CONTROLLER WITH ON-OFF TIME PROPORTIONING
Milton R. Carlson, Rockford, Ill., assignor to Barber-Colman Company, Rockford, Ill., a corporation of Illinois
Filed May 8, 1964, Ser. No. 366,055
16 Claims. (Cl. 331—66)

The present invention relates in general to closed loop systems for automatically controlling a variable condition so as to bring it to, and maintain it at, a desired or "set point" value. More particularly, the invention relates to the so-called on-off type of control systems, and to the kind in which the ratio or proportion of "on" and "off" time periods is automatically changed as the variable condition approaches the set point value, so as to reduce overshoot and the amplitude of hunting about the set point.

It is the general aim of the invention to provide a novel control of the time-proportioning, on-off type which is characterized by simplicity, economy, and compactness of construction, and which achieves high precision and reliability in operation.

More specifically, it is an object to achieve the foregoing in a manner which does away with the complexity and expense of electrical heaters, the need to dissipate heat generated by such heaters, and the moving parts and bimetal elements of prior art systems, such as that disclosed for example by Welker et al. U.S. Patent 2,873,368.

Another object of the invention is to provide such a novel control in which the time proportioning operation is achieved by purely electrical feedback which shifts the response of a controlling transducer to the sensed value of the condition being controlled, but without otherwise changing the normal operation of the transducer.

Still another object is to provide a simple and compact control system wherein an oscillator responsive in its tuning to the value of the controlled condition is additionally made responsive directly in its tuning to a contral voltage varying with time in response to actuation and deactuation of the energy controlling device, thereby to effect time-proportioning action.

An additional object is to produce a progressive change in the on-off time ratio as a set point is approached, by the simple procedure of producing and utilizing a control voltage which changes in a generally stair-step fashion, with successive steps being of shorter duration, as successive on-off cycles occur.

It is a further object to provide such a time-proportioning control system in which the time proportioning band, and the on-off cycling rate, may be readily adjusted through the provision of simple and inexpensive adjustable components, such as potentiometers or rheostats.

It is a related object to provide an on-off controller in which a D.C. control signal varies in response to changes in the value of the controlled condition, and characterized in that on-off switching of a bi-state device in response to the control signal falling below or rising above a predetermined value is accomplished without any disturbance or adverse affect in the control circuits which produce that D.C. signal.

Still another object is to provide an on-off type of controller in which the signal-switching device is a magnitude discriminator devoid of any dead band, extremely sensitive to a slowly changing control signal, and operable from an alternating voltage power source.

Other objects and advantages of the invention will become apparent as the following description proceeds, taken in conjunction with the accompanying drawings, in which:

FIGURE 1 is a block diagram illustrating a control system of the general type to which the present invention relates;

FIG. 2 is a schematic diagram showing in detail a control system like that illustrated in FIG. 1, and which constitutes a preferred embodiment of the invention;

FIGS. 3a, 3b, and 3c are schematic diagrams corresponding to a portion of the circuit shown in FIG. 2 and illustrating generally equivalent circuits so far as operation with respect to high frequency alternating current and direct current is concerned;

FIG. 4 is a series of graphical representations illustrating variations of several signals, conditions, or states during typical operation of the present control system in bringing a controlled condition up to and maintaining it at a desired value;

FIG. 5 is a graphical representation of oscillation frequencies and parallel resonant frequencies which occur in the oscillator of FIG. 2 under three different circumstances during the operation represented by FIG. 4;

FIG. 6 is a classical graphical representation of the net reactance of a parallel inductance-capacitance circuit to alternating current at different frequencies measured relative to the resonant frequency, this graph being helpful in understanding the operation of the oscillator shown in FIG. 2, and FIG. 7 is a graphical representation of the effective reactances presented by parallel inductive-capacitive circuits in the oscillator of FIG. 2 under three different circumstances of operation.

While the invention has been shown and will be described in some detail with reference to a particular exemplary embodiment thereof, there is no intention that it thus be limited to such detail. On the contrary, it is intended here to cover all modifications, alternatives, and equivalents falling within the spirit and scope of the invention as defined by the appended claims.

Referring now to FIGS. 1 and 2, an on-off control system constituting an exemplary embodiment of the invention has there been illustrated. In general, the system comprises means for controlling the supply of energy from an energy source 10 (shown specifically as an A.C. power source in FIG. 2) to an energy utilization device 11 (shown specifically as an electric heater in FIG. 2) so as to bring a variable condition 12 (specifically, the temperature of a furnace 12' in FIG. 2) up to a desired value and maintain it at such value. For this purpose, a condition sensor 14 is employed to produce an output manifestation or signal proportional to the actual value of the variable condition. As illustrated in FIG. 2, for the exemplary case of controlling a temperature, the sensor 14 may take the form of a thermocouple 15 disposed in the furnace 12' and producing a small D.C. voltage which is substantially proportional to the furnace temperature. The output voltage of the thermocouple 15 is applied to the moving coil 16 of a sensitive voltmeter, e.g., a D'Arsonval galvanometer 18 (only partially shown), and which may include a pointer 19 movable along a scale 20. The pointer 19 carries a vane or "flag" 21 of nonmagnetic metal such as aluminum, and the position of the latter is thus a manifestation or signaling of the actual value of the temperature in the furnace 12'.

Means for producing a control signal which normally varies in proportion to the actual value of the furnace temperature, over a preselected band of values of the latter, are provided in the form of a transducer 22 associated with and responsive to the sensor 14. In the form illustrated by FIG. 2, such transducer is an oscillator which includes first and second resonant circuits 24 and 25, one of which is variably tuned according to the position of the flag 21. The oscillator is supplied with operating energy from a suitable D.C. voltage source, here illustrated as a battery 26, and includes an output circuit which produces a D.C. control signal in the form of current through a load resistor 28. Such D.C. current and the resulting voltage signal S are normally proportional in magnitude to the position of flag 21, and thus to the sensed value of the furnace temperature.

The oscillator 22 will be described in detail below, and for the present it will suffice to note that the first resonant circuit 24 includes an inductance coil 29 formed of two sections 29a, 29b and between which the flag 21 progressively advances as the furnace temperature rises. As the flag 21 enters and progresses further between the coil sections 29a, 29b, mutual coupling between those sections is progressively decreased, and the inductance of the coil 29 is reduced, thereby increasing the resonant frequency of the circuit 24 and normally causing (in a manner to be explained below) a reduction in the D.C. current passing through the resistor 28. It will be apparent that the flag 21 affects the inductance of the coil 29 only when the furnace temperature rises to a value which makes the flag begin to enter between the coil sections. For this reason, the oscillator 22 is a device which normally produces a D.C. signal generally proportional (in this case, inversely proportional) to the actual value of the variable condition (e.g., the temperature of furnace 12'), but only over a predetermined band of condition values. This band is called the "proportional band," and its lower edge as well as the "set point" or desired furnace temperature may be adjusted by physically adjusting the coil 29 to different positions along the path of the flag by means of a suitable mechanism (not shown). Associated with the coil 29 is a physical stop (not shown) which prevents the flag 21 from moving completely through the coil sections 29a, 29b, i.e., from moving beyond a position at which the coil inductance has been reduced to its lowest value.

Responsive to the D.C. control signal S produced by transducer or oscillator 22 is a magnitude discriminating bi-state device or switch 30, the latter being shown in FIG. 2 as comprising a silicon controlled rectifier SCR 31 and a relay 32 controlled thereby. This discriminator switch changes from one state to the other ("on" or "off") as the D.C. control signal S passes upwardly or downwardly through a predetermined critical value. In the present instance, when the D.C. current through, and the voltage signal S across, the load resistor 28 rise above a predetermined value, the bi-state switch 30 is turned "on" and the relay 32 is actuated; when that D.C. current and voltage fall below the predetermined value, then the bi-state device 30 is switched to its opposite state and the relay 32 is deactuated. The relay 32 has normally open contacts 32a, 32b which close in response to pickup of the relay and thus connect the A.C. power source 10 to energize the heater 11. When turned on in this fashion, the heater 11 creates heat energy in the furnace 12' to raise its temperature, and when the heater 11 is turned off the temperature of the furnace will fall due to heat losses to the atmosphere.

With the foregoing general description attention may now be turned to the construction and operation of the oscillator 22. As its principal components, such oscillator includes the first and second resonant circuits 24 and 25 connected in the input and output circuits of a high frequency amplifying transistor 34 having emitter, base, and collector electrodes labeled e, b and c. The oscillator 22 further includes a D.C. output circuit which may be viewed as comprising the voltage source or battery 26, a resistor 35, the load resistor 28, a biasing resistor 36, and the emitter e and collector c of the transistor 34. High frequency oscillatory currents which occur in the transistor are shunted around the battery 26, the resistor 35 and the load resistor 28 by a capacitor 38, so that for practical purposes the voltage S appearing across the resistor 28 is variable D.C. voltage. As a general statement, the D.C. current which flows through the source 26 and the resistor 28 is dependent upon the D.C. current which flows through the emitter-base junction of the transistor 34, and this latter current is in turn dependent upon the magnitude of the D.C. biasing voltage tending to make the base b negative with respect to the emitter e. The manner in which this biasing voltage varies will be explained below.

The first resonant circuit 24 will for convenience hereinafter be called the detector tank, since it is a parallel resonant circuit which detects the position of the flag 21 relative to the coil 29. This detector tank 24 is formed by the coil 29 in parallel with a capacitor 40 to form a parallel circuit resonant at a frequency $f_1$. With the flag 21 free of the coil 29, the initial value of $f_1$ may be determined by adjustment of the capacitor 40, and the resonant frequency $f_1$ will thereafter increase as the flag 21 moves into the coil 29. As shown in FIG. 2, the detector tank 24 is connected in series with the biasing resistor 36, the parallel circuit 25, the emitter-base junction of the transistor 34 and a D.C. blocking capacitor 41. A capacitor 42 paralleled with the resistor 36 serves as a high frequency shunt around the latter so that it is in effect a zero impedance for high frequency oscillations. Inasmuch as the blocking capacitor 41 also presents a very low impedance to high frequencies, the detector tank is, in effect, connected in series with the emitter-base junction through the second resonant circuit 25.

The second resonant circuit 25 will hereinafter be called the reference tank, since it is constituted by an inductance coil 44 in parallel with a capacitor 45 (and in part by another capacitance to be described), so as to have a parallel resonant frequency $f_2$ which may be viewed as a reference value in comparison with the resonant frequency $f_1$ in understanding the operation of the oscillator. The reference tank 25 may be connected directly in series between the upper end of the biasing resistor 36 and the emitter e, but in some instances it may be preferable to connect the emitter to a tap on the coil 44, as here shown, in order to provide a more desirable feedback ratio for sustaining high frequency oscillations. Insofar as high frequency oscillations are concerned, current may flow from the tank 25 through the emitter and collector of the transistor 34, through the bypass condenser 38, the capacitor 42, and back to the tank 25. Because the detector tank 24 is in effect connected in series with the reference tank 25 in the emitter-base circuit of the transistor 34, there is feedback coupling between the input and output circuits of the transistor and sustained oscillations may occur once they have been initiated.

For the sake of brevity, a detailed and theoretical explanation of how oscillations are built up and sustained will not be presented. It will suffice to note that when the negative bias on the base b (relative to the emitter e) is sufficiently great, the transistor 34 is conductive and the circuit oscillates at a frequency $f_0$ which is intermediate and substantially midway between the parallel resonant frequencies $f_1$ and $f_2$ of the detector and reference tanks 24 and 25. If it is assumed merely for purposes of explanation that the detector tank 24 is initially tuned (by adjustment of the capacitor 40) to be resonant at a frequency of 26.5 mc. with the flag 21 remote from the coil 29, and the reference tank 25 is parallel resonant at a frequency of 27.5 mc., the oscillator will oscillate at a frequency of about 27 mc. The amplitude or strength of such oscillations is variable, however, and depends upon the difference between the parallel resonant frequencies $f_1$ and $f_2$, or more particularly upon the relationship between the net reactances presented by the two respective tanks 24 and 25 at the oscillation frequency $f_0$. In general, because the resonant frequency $f_1$ is below the oscillation frequency $f_0$, the tank 24 will appear as an equivalent capacitive reactance $-X_1$; and because the resonant frequency $f_2$ is greater than the oscillation frequency $f_0$, the reference tank 25 will appear as an equivalent inductive reactance $+X_2$. As these two equivalent reactances become more nearly equal, the oscillations of the oscillator become stronger, and reach their maximum amplitude when the equivalent reactances are equal and opposite (one being capacitive and the other inductive) so that the two tanks form a series resonant circuit.

Assuming that the flag 21 is positioned clear of the coil 29 and that a switch 46 is closed to put the oscillator in operation, a voltage divider formed by resistors 47, 48, 49 is connected between the negative terminal of the battery 26 and the lower end of the resistor 36 (ground). Voltage drops across resistors 47–49 are thus created as indicated by the uncircled polarity signs, making the base $b$ negative with respect to the emitter $e$ so that the transistor 34 is rendered conductive. This immediately starts oscillations which are sustained by feedback coupling and which have a frequency $f_0$, as previously explained.

When such oscillations occur, however, the negative bias on the base $b$ is reduced, and to an extent which is determined by the strength or amplitude of oscillations, i.e., determined by the relative values of the resonant frequencies $f_1$ and $f_2$, and thus by the position of the flag 21 which controls the resonant frequency $f_1$.

This is accomplished by virtue of the fact that high frequency oscillating voltages appearing at the emitter $e$ are in part rectified by the emitter-base junction of the transistor 34 so that the D.C. blocking capacitor 41 (which appears as a short circuit to high frequency oscillations) is charged with a D.C. voltage of the polarity indicated. As a result, the bias voltage on the base $b$ is made less negative than that which would be produced by the voltage divider alone, and the conductivity of the transistor 34 is reduced. The magnitude of the D.C. voltage appearing across the blocking capacitor 41 is related to the amplitude or strength of the high frequency oscillations which are rectified by the emitter-base junction. The greater the amplitude of these oscillations, the greater is the voltage across the capacitor 41 and the less negative is the bias on the base $b$, so that the transistor 34 becomes less conductive for direct current, and the signal voltage S appearing across the load resistor 28 is reduced. In summary, as the net reactances $-X_1$ and $+X_2$ of the detector and reference tanks 24 and 25 become more nearly equal at the frequency of oscillations $f_0$, the amplitude of oscillations becomes greater and the D.C. signal S becomes smaller; and as the net reactances of the tank circuits 24 and 25 become more unequal at the oscillating frequency $f_0$, the amplitude of oscillations decreases and the control signal S is increased. While a more detailed explanation of operation will be presented below, it may be stated here that if the resonant frequency $f_2$ of the reference tank remains constant, then the D.C. signal S will be relatively high when the flag 21 is positioned free of the coil 29, and will be progressively lowered as the flag 21 moves into the coil 29. In other words, the oscillator 22 normally functions as a transducer which produces a D.C. control signal S which is inversely proportional to the position of the flag 21 once the latter begins to enter the coil 29.

Although not essential to successful operation, the present oscillator is one which operates with time-spaced pulses of oscillations. The controlling bias voltage across the emitter-base junction of the transistor, is, in effect, formed by the algebraic sum of the voltage drops (uncircled polarity signs) across resistors 48, 49 and 36. As oscillations begin, the build-up of D.C. voltage on the blocking capacitor 41 results in the latter discharging by current flow through resistors 48 and 49, this current producing, in effect, voltage drops represented by circled polarity signs which subtract from the original voltage drops, thereby making the base $b$ less negative in potential relative to the emitter $e$. Also as D.C. current begins and flows in the output circuit of the oscillator, it increases the D.C. voltage drop across the biasing resistor 36, further making the base $b$ less negative with respect to the emitter $e$. The blocking capacitor 41 charges quickly by partial rectification at the emitter-base junction when oscillations begin, and to the level dependent upon the amplitude of the oscillations. But the voltage build-up on the blocking capacitor 41 may be so great as to totally turn the transistor 34 off, thereby terminating or drastically reducing the amplitude of oscillation. The capacitor 41, however, then discharges relatively slowly until the potential at the base $b$ again becomes sufficiently negative with respect to the emitter $e$ that oscillations start again. This intermittent or amplitude modulation of the oscillator is called "squegging." It does not, however, directly affect the D.C. signal S since both the oscillation frequencies and the "squegging" frequencies are by-passed by capacitor 38. For purposes of discussion, therefore, it may be considered that the D.C. signal S is inversely proportional to the average voltage on the blocking capacitor 41 and thus inversely proportional to the amplitude of the oscillating current in the oscillator.

In accordance with one feature of the invention, the discriminating bi-state switching device 30 is constructed so as to switch between its two states as the control signal S passes through a predetermined value, yet without introducing disturbing effects on the operation of the oscillator itself. For this purpose, the device 30 includes the SCR 31 having its gate $g$ and cathode $c$ connected across the load resistor 28. The anode and cathode $a$ and $c$ of the SCR are connected in series circuit with an A.C. voltage source 51 and the coil of relay 32. A capacitor 52 is connected across the relay 32 so as to smooth the pulsating D.C. voltage supplied thereto when SCR 31 is conductive. Further a diode 53 is also paralleled with the relay coil to quench any tendency of the relay coil and capacitor to "ring" or oscillate when the SCR is abruptly turned off. This smoothing and quenching by the capacitor 52 and diode 53 eliminate chatter of the relay which might otherwise cause indecisive operation.

The load resistor 28 is here shown as a thermistor having a substantial negative temperature coefficient of resistance. As the temperature of the SCR 31 and the thermistor 28 goes up or down, therefore, the "firing" potential of the SCR goes down or up, the D.C. voltage S goes down or up for a given value of the direct current flowing through the D.C. circuit of the oscillator. In this way, compensation is effected for the temperature sensitivity of the SCR 31 and the latter fires (for at least 90° of conduction on each positive half wave of the A.C. voltage produced by the source 51) when the oscillator direct current reaches a predetermined value. The circuit is thus rendered extremely sensitive to switching when the direct current of the oscillator circuit reaches a predetermined value.

To filter and shunt any A.C. variations which may be present in the D.C. circuit of the oscillator, a capacitor 54 is paralleled with the thermistor 28.

When the D.C. control signal S is below a predetermined value, i.e., less than the critical "firing" voltage of the SCR 31 with the anode $a$ at its peak voltage on a positive half wave of the A.C. source 51, the SCR does not conduct at all, and it appears as an open circuit. Accordingly, the relay 32 is de-energized and its contacts 32$a$, 32$b$ are open so that the heating 11 is turned off. When the D.C. signal S reaches the predetermined firing potential of the SCR 31, the latter will begin conduction at a 90° phase angle on each positive half cycle of the source 51, so that the SCR appears as a closed switch during the succeeding 90° of each positive half cycle of the source voltage. Thus, a pulsating D.C. voltage is applied to the relay 32 and smoothed by the capacitor 52 so that the relay 32 is picked up and its contacts 32$a$, 32$b$ closed to turn on the heater 11. The relay 32 is thus switched "on" or "off"

when the signal S is above or below a predetermined value.

Provision is made to assure that the relay 32 does not pick up and drop out rapidly due to minor fluctuations in the control signal S, or minor oscillations of the flag 21. For this purpose, means are provided and made responsive to switching "on" of the bi-state device for increasing the value of the D.C. signal S above that which it would otherwise have. In particular, the transducer or oscillator is made responsive to the voltage appearing in the SCR circuit when the latter is conductive, and so that the signal S increases when the relay 32 picks up even though the flag has not changed positions. As here shown, a feedback connection is established from the lower side of the capacitor 52 via a conductor 55 and a resistor 56 to the junction of the voltage-dividing resistors 48 and 49. Whenever the SCR 31 fires, the conductor 55 swings negative in potential relative to ground, and the feedback connection thus increases the negative bias on the transistor base $b$. In response to such increasing negative bias, the transistor 34 becomes more conductive and the D.C. voltage S increases (even though the tuning of the resonant circuits in the oscillators has not changed). By this feedback connection, therefore, the SCR 31 when once fired is maintained in a firing condition until the tuning of the oscillator is changed sufficiently to reduce the D.C. signal by a significant amount. The opposite effect occurs when the D.C. signal S falls below the predetermined firing potential of the SCR 31 and the latter is rendered nonconductive. Under these circumstances, the conductor 55 returns to ground potential so that the additional negative bias of the feedback connection is removed, and the transistor 34 becomes less conductive to D.C. current. As a result, the D.C. signal S is reduced still further, so that the SCR will not fire again until the tuning within the oscillator has been changed enough to cause a significant increase in the D.C. signal S.

The present bi-state switching device is characterized by several important advantages. The silicon controlled rectifier 31 is a compact and reliable device free of any mechanical failure, and requiring only the application of very small current and power to its gate $g$ for reliable operation. The SCR 31 presents a purely resistive load in parallel with the thermistor 28, and since the value of this resistive load does not change appreciably when the SCR is switched between its conductive and nonconductive states, there appear across the resistor 28 no transient signals which might be transferred to the oscillator circuit itself and disturb the operation of the latter. Because the SCR 31 is itself a rectifying device, the power for operating the relay 32 may be taken from an A.C. source and yet the relay 32 may be a standard, direct current type free of the hum and chatter which is sometimes characteristic of A.C. relays. The relay 32 need not be specially constructed to be voltage sensitive so as to function as a signal discriminator; the SCR 31 provides the coil 32 either with a high voltage or zero voltage, so that the relay 31 either picks up or drops out reliably. Still further, the SCR 31 is very sensitive in responding to the D.C. control signal S, particularly as that signal slowly approaches the predetermined value at which the SCR fires. The use of the SCR 31 controlling a conventional and relatively inexpensive D.C. relay 32, therefore, not only obviates the need for an extremely sensitive relay connected in the D.C. circuit of the oscillator, but it also switches more reliably between the on-off condition than a voltage sensitive relay. The present arrangement is also especially advantageous in that a feedback voltage for achieving more decisive operation of the relay 32 is derived directly from the conductor 55 and is not dependent upon the opening or closing of any relay contacts.

In order that the system will operate with proportioning of the on-off periods of the heater 11, a time proportioning feedback device 57 is, in effect, interconnected between the bi-state device 30 and the transducer 22 (FIG. 1). In accordance with the present invention, such time proportioning feedback is achieved by including in the transducer a voltage-controlled variable impedance, together with means responsive to the impedance value thereof for changing the factor of proportionality between the control signal S and the sensed value of the variable condition. Moreover, provision is made to change, gradually and smoothly, the voltage applied to such controlled impedance each time that the bi-state device 30 switches states, the direction of the voltage change being such as to cause the bi-state device to again switch sooner than it otherwise would in response to changes in the value of the variable condition.

As here illustrated, the voltage-controlled variable impedance takes the form of a semi-conductor junction diode 58 (FIG. 2) of the type which exhibits a substantial electrical capacitance between its opposite electrodes. Such capacitor-diodes are available commercially and are known to possess a capacitance which varies according to an inverse, non-linear function of a reversely biasing D.C. control voltage applied thereto. It may be generally considered, by way of example, that the capacitance value of the diode 58 varies in proportion to the value of a control voltage raised to a negative exponent.

For causing changes in the capacitance of the diode 58 to modify the relationship between the sensed value of the variable condition (i.e., flag position) and the output signal S, the diode 58 is incorporated into and forms a part of one of the resonant circuits in the oscillator 22. In the example illustrated by FIG. 2, the diode 58 is connected in series with a small capacitor 59 between one end of the parallel circuit 44, 45 and the lower end of the resistor 36 (ground). In net effect, the capacitance of the diode 58 is in parallel with the capacitor 45 and thus in part determines the value of the resonant frequency $f_2$. FIG. 3a illustrates this portion of the circuit of FIG. 2, and differs only in that the capacitor-diode 58 is symbolically shown as constituting a variable capacitor. FIG. 3a in its response to high frequency oscillations may be considered as equivalent to the circuit shown in FIG. 3b. That is, insofar as oscillatory currents and voltages are concerned, the capacitor-diode 58 and the small capacitor 59 may be lumped together and considered as a single variable capacitor 58′ (FIG. 3b). The biasing resistor 36 and the shunting capacitor 42 (FIG. 3a) together constitute in effect a zero impedance, so that they can be omitted from the equivalent circuit of FIG. 3b. This leaves the coil 44 in parallel with both of the capacitors 45 and 58′ in FIG. 3b. In net effect a single capacitance equal in value to the sum of the capacitors 45 and 58′ is connected in parallel with the coil 44. Thus, as the value of the capacitor 58′ is changed, the resonant frequency $f_2$ of the reference tank will be changed, according to the well known relation:

$$\text{Resonant freq.} = \frac{1}{2\pi\sqrt{LC}} \qquad (1)$$

where L is the inductance of coil 44 and C is the sum of the capacitances of the capacitors 45 and 58′.

As noted above, the operating frequency $f_0$ of the oscillator is dependent not only upon the resonant frequency $f_1$ but also upon the resonant frequency $f_2$. Moreover, the D.C. current which flows in the oscillator and the D.C. signal S are dependent upon the relation of the net reactances exhibited by the tank circuits 24 and 25 at the oscillation frequency $f_0$. Thus, it will be apparent now (and explained more fully below) that if the resonant frequency $f_1$ remains constant, then a change in the capacitance exhibited by the diode 58 will cause a change in the oscillator direct current and thus in the magnitude of the control signal S even though the value of the sensed condition (i.e., furnace temperature and flag position) does not change.

To establish a feedback connection from the bi-state device 30 and to produce a control voltage on the capacitor-diode 58 which causes the resonant frequency $f_2$ to increase or decrease smoothly and gradually in response to each switching of the bi-state device 30, the relay 32 is provided with normally closed contacts 32c–d, and normally open contacts 32c–e. When closed, the normally closed contacts 32c–d connect a suitable D.C. voltage source, here shown as a battery 60, across a potentiometer 61 having an adjustable wiper 61a upon which appears an adjustable D.C. voltage $E_w$ of the indicated polarity. When that voltage is present on the wiper 61a, a resistance-capacitance circuit formed by a rheostat 62 and a capacitor 64 will be charged, the voltage $E_c$ across the capacitor 64 exponentially rising with a time constant depending upon the product of the capacitance value and the adjusted value of the rheostat 62. On the other hand, when the relay 32 is actuated so that the contacts 32c–e close, the potentiometer 61 is shorted and the capacitor 64 will then discharge through the rheostat 62 and a portion of the potentiometer 61. Thus, whenever the relay drops out, the voltage appearing across the capacitor 64 will exponentially decay with a predetermined time constant.

The capacitor 64 is here shown as connected through a current limiting resistor 65 across the variable capacitance diode 58, the voltage $E_c$ appearing as a reversely biasing D.C. control voltage across the diode 58. FIGS. 3a and 3c make this clear. Because the value of capacitor 59 is small, it charges and discharges fully with a negligible time constant, and may be viewed as constituting an open circuit for varying D.C. voltages. Thus, the capacitor 59 appearing in FIG. 3a may be represented as an open connection in the equivalent circuit of FIG. 3c. Thus, the control voltage $E_c$ is applied with the indicated polarity across the diode-capacitor 58. As this control voltage $E_c$ increases or decreases in response to the capacitor 64 charging or discharging, the capacitance of the diode 58 decreases or increases nonlinearly in relation thereto.

Assuming that under initial conditions the bi-state device 30 is "on," the relay 32 energized, and the capacitor 64 fully discharged, the control voltage $E_c$ applied across the diode 58 will be zero. The capacitance of diode 58 will have its highest possible value, thereby making the resonant frequency $f_2$ have its lowest value. When the bi-state device turns "off" due to the flag 21 entering the coil 29, the relay 32 is de-energized and contacts 32c–d close, capacitor 64 exponentially charges, and the control voltage on the diode 58 exponentially rises so as to smoothly decrease the diode capacitance. This in turn smoothly increases the resonant frequency $f_2$. Assuming that the resonant frequency $f_1$ remains constant, such increase in the resonant frequency $f_2$ results in weaker oscillations in the oscillator, and the D.C. signal S increases until it ultimately causes the bi-state circuit 30 to switch back to its "on" state. With the voltage $E_w$ now made zero by closure of contacts 32c–e, the capacitor 64 will begin to smoothly discharge and the control voltage applied to the diode 58 will decrease to cause an increase in its capacitance, a decrease in the resonant frequency $f_2$, stronger oscillations, and a decrease in the control signal S until the bi-state device 30 is again turned "off." Thus, the control voltage $E_c$ increasing or decreasing in response to the bi-state device 30 changing states is applied to the voltage-controlled capacitor diode 58 in a sense which makes the bi-state device switch sooner than it otherwise would.

*Resume of operation*

The operation of the system shown in FIG. 2, and its effect in producing proportioning of "on" and "off" time periods may best be described with reference to FIGS. 4–6. Assume that the furnace 12' is initially cold or at ambient temperature (curve 70 in FIG. 4) at an instant $t_1$, and that switch 46 has been closed. The flag 21 will be down-scale and free of the coil 29, so that the inductance of the latter will have its highest value, and the resonant frequency $f_1$ will have its lowest value (see Equation 1, supra). As a result, oscillatory currents in the oscillator 22 will be relatively weak, and the D.C. signal S (curve 71) will be relatively high as indicated by curve portion 71a. Because the D.C. signal S exceeds the critical firing voltage for the SCR 31, the latter will be firing on each positive half cycle and the relay 32 will be picked up as indicated by portion 72a of curve 72. Under these circumstances, the relay contacts 32a–b are closed to energize the heater 11, and the furnace temperature rises in the period between instants $t_1$ and $t_2$, as indicated by curve portion 70a. Also, the feedback conductor 55 is at a negative potential relative to ground so that the D.C. signal S is somewhat greater than it otherwise would be.

Under these conditions, the relay contacts 32c–e are closed, so that the potentiometer voltage $E_w$ is zero (see portion 74a of curve 74), the control voltage $E_c$ is zero (see curve portion 75a of curve 75), and the diode 58 has its maximum value of capacitance (see portion 76a of 76). Thus, the resonant frequency $f_2$ has its lowest value under these initial circumstances. By presetting the capacitor 40, the value of the resonant frequencies $f_1$ and $f_2$ are so chosen that the former is less than the latter as graphically illustrated in Line A of FIG. 5. The oscillator thus operates at a frequency $f_0$ which is intermediate to the initial resonant frequencies $f_1$ and $f_2$.

Referring to FIG. 6 and Line A of FIG. 5, the initial operating frequency $f_0$ is greater by an amount $\Delta f_a$ than the resonant frequency $f_1$, but is less by an amount $\Delta f_b$ than the initial resonant frequency $f_2$. It will be apparent from FIG. 6 that the detector tank 24 thus presents a capacitive reactance $-X_1$, while the reference tank 25 appears as an inductive reactance $+X_2$, these being illustrated at Line A of FIG. 7. At the frequency $f_0$, the reactance $X_1$ is greater in magnitude than the reactance $X_2$ (see FIG. 6) so that the two tank circuits 24 and 25 are not series resonant at the initial operating frequency $f_0$. It is for this reason that oscillations during the interval between $t_1$ and $t_2$ are relatively weak, the bias voltage on capacitor 41 is relatively low, and the D.C. control signal S is relatively high, so that the bi-state device 30 and the heater 11 are turned "on."

As the temperature of the furnace 12' rises, the flag 21 will begin to enter the coil 29 at some instant $t_2$ (FIG. 4), and as the inductance of the coil 29 progressively decreases, the resonant frequency $f_1$ increases. As $f_1$ increases, the oscillation frequency $f_0$ also increases by about half as much, since the resonant frequency $f_2$ at this time remains substantially constant. When the time instant $t_3$ is substantially reached, the frequency $f_1$ has increased to a value $f_1'$ and frequency $f_0$ has increased to a value $f_0'$ while the frequency $f_2'$, remains equal to the original value $f_2$. Compare Lines A and B of FIG. 5. Correspondingly the value of $\Delta f_b$ becomes smaller, and the effective reactances of the two tank circuits are both increased in magnitude, but the new reactance value $-X_1'$ is more nearly equal in magnitude to the new reactance value $+X_2'$ (FIG. 7). Because the two tank circuits 24 and 25 thus approach more nearly the condition of being series resonant ($|X_1| = |X_2|$) as the oscillation frequency approaches the value $f_0'$, the bias on capacitor 41 increases and the D.C. signal S decreases, as indicated by curve portion 71b. During this period of time, i.e., between the instants $t_2$ and $t_3$, the D.C. signal S is substantially proportional to the extent that the flag 21 projects between the two halves of the coil 29, and thus to furnace temperature.

At the instant $t_3$ (FIG. 4) and when the frequencies and reactances have the relations illustrated by Lines B in FIGS. 5 and 7, the flag 21 has caused the D.C. signal S to reach and drop just below the critical firing potential of the SCR 31, even though the furnace has not yet reached the desired set point temperature. Accordingly, the bi-state device 30 switches to the "off" state, the relay 32 drops out, and the heater 11 is turned off. The temperature in the furnace 12' will, however, continue to rise slowly due to thermal inertia.

When relay 32 drops out at instant $t_3$, the negative potential on line 55 is removed, so the D.C. signal S immediately jumps downwardly, as indicated at curve portion 71$j$. Moreover, the contacts 32$c$–$d$ close so that the voltage $E_w$ jumps (see 74$j$) to the value determined by the setting of potentiometer wiper 61$a$. Accordingly, capacitor 64 begins to charge exponentially as indicated by curve portion 75$b$, and the effective capacitance of the diode 58 begins to smoothly fall, as is indicated by curve portion 76$b$. (Note: No attempt has been made to illustrate precisely the manner in which the capacitance of diode 58 changes with time. As a schematic illustration simplified for purposes of explanation, the variation has been shown as exponential.) As this occurs, the resonant frequency of the tank 25 increases from the $f_2'$ value toward a new value $f_2''$, thereby increasing the oscillation frequency from the $f_0'$ value toward a new value $f_0''$ (compare Lines B and C of FIG. 5). As a result of these changes, the values of $\Delta f_a$ and $\Delta f_b$ both increase and both the effective reactance magnitudes $-X_1$ and $+X_2$ decrease, but the former decreases more than the latter until they have the relative values represented at $-X_1''$ and $+X_2''$ in Line C of FIG. 7. In other words, the magnitudes of $-X_1$ and $+X_2$ become less nearly equal, so the tank circuits magnitudes of $-X_1$ and $+X_2$ become less nearly equal, so the two tank circuits depart further from a condition of being series resonant with one another, and the strength of oscillations decreases. Thus, by the time instant $t_4$ when the conditions of Lines C in FIGS. 5 and 7 obtain, the bias on capacitor 41 has decreased and the magnitude of the D.C. signal S has smoothly increased (curve portion 71$c$) to a level at which it causes the bistate device 30 to switch back "on." It will be seen from curve portion 75$b$ that the voltage $E_c$ on the capacitor 64 has had insufficient time between the instants $t_3$ and $t_4$ to charge fully to the value of the voltage $E_w$.

With the bi-state device turned "on" at instant $t_4$, a negative potential appears on conductor 55, so that the D.C. signal S jumps upwardly as indicated at 71$j'$. Current is again applied to the heater 11 so that the temperature of the furnace is caused to rise further, and the flag 21 moves more fully into the coil 29. Accordingly, the inductance of the coil 29 will further decrease, the resonant frequency $f_1$ of the tank circuit 24 will further increase, the D.C. signal S will be decreased (curve portion 71$d$) toward a value at which the bi-state device will switch "off." As this is taking place, however, the capacitor 64 discharges, and the voltage $E_c$ falls exponentially as indicated by curve portion 75$c$. The falling voltage $E_c$ makes the capacitance of the diode 58 increase (curve portion 76$c$) so that the resonant frequency $f_2$ correspondingly decreases. The effect of the flag 21 moving into the coil 29 tends to cause the bi-state device again to turn "off," but the effect of this progressive decreasing of the resonant frequency of $f_2$ (as a result of the capacitor 64 discharging) also tends to cause the bi-state device to turn "off." In result, therefore, the signal S falls to the predetermined firing potential of the SCR at time instant $t_5$, and sooner than it would have done so if the control voltage $E_c$ had not decayed. However, because the time period between instants $t_4$ and $t_5$ is shortened by movement of the flag 21 further into the coil 29, the capacitor 64 does not fully discharge to zero volts before the device 30 is switched "off," and the contacts 32$c$–$d$ reclose at instant $t_5$ to cause capacitor 64 to start charging again along curve portion 75$d$.

The cycle of operations just described repeats over and over, with the capacitor 64 successively charging and discharging. One each such cycle, the capacitor discharges to a voltage level which is slightly higher than that from which it began the preceding charge, so that the control voltage $E_c$ (see curve 75) progressively builds up to a higher average value. This means that the rate of charging becomes smaller during successive cycles because each successive charging begins from a point more nearly equal to the maximum value which the voltage $E_c$ can reach. The rate of discharging becomes greater during successive cycles because it begins at a higher voltage value. As a result, the ratio of "on" to "off" periods becomes smaller as the set point is approached (compare curves 72 and 70). In other words, the control voltage $E_c$ applied to the diode 58 to change its effective capacitance rises and falls somewhat in "stair-step" fashion as illustrated by curve 75, the successive upward steps becoming progressively longer in duration and the downward steps become shorter in duration.

By this organization and operation, therefore, the rate of furnace heating becomes smaller as the set point is approached, by virtue of the fact that the ratio of "on" and "off" time periods decreases as a function of flag position and furnace temperature. Thus, the furnace may be heated at a higher rate during the individual "on" periods, but without risk of overshooting the set point to a considerable degree because the ratio of on-periods to off periods is decreased as the set point is approached. By the time the set point is reached at time $t_7$ in FIG. 4, the capacitor 64 is charging and discharging only a slight amount, and the average value voltage $E_c$ almost equals the voltage $E_w$. When the time proportioning band is traversed downwardly, the same operation will occur in a reverse sense, i.e., the ratio of "on" and "off" time periods will progressively increase as the flag moves out of the coil 29.

The present invention makes it both simple and convenient to effect adjustments in the cycling rate and time proportioning band. To vary the cycling rate, the time constant for the R-C circuit 64, 62 is adjusted. This may be done by changing the effective value of the rheostat 62. With a shorter or longer time constant, the control voltage $E_c$ rises and falls more quickly or more slowly, so that the "stair-steps" illustrated by curve 75 occur with a faster or slower cycling rate.

On the other hand, the time proportioning range or control band over which the changing of on-off time ratios occurs may be adjusted by providing means to vary the limit value which the exponentially varying control voltage $E_c$ can reach. This is accomplished here by the adjustable potentiometer 61 whose setting determines the value of the voltage $E_w$. The latter voltage represents the maximum value which the control voltage $E_c$ ultimately reaches, and thus the minimum value of capacitance of the diode 58. Once these limiting values are reached, then the system settles into an equilibrium condition. By changing the value of the voltage $E_w$, the number of "stair-steps" or cycles which occur before equilibrium is reached is increased or decreased, and the sensitivity of the system may be matched to the characteristics of the particular furnace or other device being controlled.

The present invention thus brings to the art a very simple and reliable on-off control system of the time proportioning type, and one which eliminates practically all mechanical devices or components by employing changing electrical signals to bring about the time-proportioning action. Moreover, the invention results in a flexible system wherein cycle rates and the time-proportioning band are easily adjusted.

I claim as my invention:

1. In an on-off system for supplying energy from a source to an energy utilization device to control a variable condition, the combination comprising first means for sensing and signalling the actual value of the variable condition, second means responsive to said first means for creating a control signal which in its magnitude is generally proportional to the actual value of said variable condition within a predetermined band of values of the latter, bi-state means switched in state in response to said control signal passing through a predetermined value for successively turning said utilization device off and on, said second means including therein a reactance element whose reactive value varies according to the changes in a control voltage applied thereacross and means responsive to variations in the reactance of said element for changing the factor of proportionality between said control signal and said actual value, and means responsive to switching of said bi-state means for changing the value of a control voltage applied across said variable reactance element and in a direction which tends to cause said control signal to pass through said predetermined value sooner than it otherwise would.

2. In an on-off system for supplying energy from a source to an energy utilization device to control a variable condition, the combination comprising first means for sensing and signalling the actual value of the variable condition, second means responsive to said first means for creating a control signal which in its magnitude is generally proportional to the actual value of said variable condition within a predetermined band of values of the latter, bi-state means switched in state in response to said control signal passing through a predetermined value for successively turning said utilization device off and on, said second means including therein a reactance element whose reactive value varies according to the changes in a control voltage applied thereacross and means responsive to variations in the reactance of said element for changing the factor of proportionality between said control signal and said actual value, and means responsive to operation of said bi-state means for smoothly and gradually changing the value of a control voltage applied across said reactance element and in opposite directions as said utilization device is turned off or on.

3. In an on-off system for supplying energy from a source to an energy utilization device to control a variable condition, the combination comprising first means for sensing and signalling the actual value of the variable condition, second means responsive to said first means for creating a control signal which in its magnitude is generally proportional to the actual value of said variable condition within a predetermined band of values of the latter, bi-state means switched in state in response to said control signal passing through a predetermined value for successively turning said utilization device off and on, said second means including therein a reactance element whose reactive value varies according to the changes in a control voltage applied thereacross and means responsive to variations in the reactance of said element for changing the factor of proportionality between said control signal and said actual value, a resistance-capacitance circuit, means for charging or discharging said circuit each time said bi-state means changes states, and means for supplying an exponentially varying voltage from said circuit across said reactance element.

4. The combination set forth in claim 3 further further characterized by means for adjusting the time constant of said resistance-capacitance circuit, thereby to adjust the on-off cycling rate of the system.

5. The combination set forth in claim 3 further characterized by means for adjusting a limit value to which the exponentially varying voltage of said resistance-capacitance circuit can vary, thereby to adjust the control band width of the system.

6. In an on-off system for supplying energy from a source to an energy utilization device to control a variable condition, the combination comprising first means for sensing and signalling the actual value of the variable condition, an oscillator including a resonant circuit variably tuned by said first means and an output circuit producing a D.C. control signal which in its magnitude is generally proportional to the actual value of said variable condition within a predetermined band of values of the latter, bi-state means switched in state in response to said control signal passing through a predetermined value for successively turning said utilization device off and on, means including a voltage-controlled variable reactance element connected with said oscillator and responsive to variations in the reactance thereof for changing the tuning and the operating frequency of the oscillator to thereby change the factor of proportionality between said control signal and said actual value, and means responsive to operation of said bi-state means for applying a slowly changing voltage across said variable reactance element and in a direction which tends to cause said control signal to pass through said predetermined value sooner than it otherwise would.

7. In an on-off system for supplying energy from a source to an energy utilization device to control a variable condition, the combination comprising means for signalling the actual value of said variable condition, an oscillator having first and second parallel resonant circuits and means for producing a D.C. control signal which in magnitude is generally proportional to the difference between the parallel resonant frequencies of said circuits, means responsive to said signalling means for increasing or decreasing the resonant frequency of one of said circuits in response to increases or decreases in the actual value of said variable condition within a predetermined band of values of the latter, bi-state means switched in state in response to said D.C. signal rising above or falling below a predetermined value for turning said utilization device off or on, a voltage-controlled variable capacitor connected in said second resonant circuit, a resistance-capacitance circuit, means responsive to switching of said bi-state device to respectively charge or discharge said resistance capacitance circuit and create an exponentially rising or falling control voltage as said utilization device is turned off or on, and means for applying said control voltage to said variable capacitor to increase or decrease the resonant frequency of said second parallel resonant circuit, thereby to cause the next switching of said bi-state device sooner than it would otherwise occur.

8. The combination set forth in claim 7 further characterized by means for adjusting the time constant of said resistance-capacitance circuit, thereby to adjust the cycling rate of the system.

9. The combination set forth in claim 7 further characterized by means for adjusting the maximum extent which said control voltage may vary, thereby to adjust the control band width of the system.

10. In an on-off system for supplying energy from a source to an energy utilization device to control a variable condition, the combination comprising first means for sensing and signalling the actual value of the variable condition, second means responsive to said first means for creating a D.C. control voltage which by its magnitude is generally proportional to the actual value of said variable condition within a predetermined band of values of the latter, a silicon controlled rectifier having a gate electrode connected to receive said control voltage and having an anode and a cathode, a relay connected in a series circuit with said anode and cathode and an A.C. voltage source, a smoothing capacitor connected across said relay so that said relay picks up and drops out in response to said control voltage rising above or falling below a predetermined value, means controlled by the state of said relay and adapted to turn said utilization device off or on, means responsive to the presence of a voltage across said capacitor for increasing said D.C. voltage above the value it would otherwise have, said second means including therein a voltage-controlled variable impedance and means responsive to the impedance thereof for changing the factor of proportionality between said control signal and said actual value, and means responsive to operation of said relay means for changing the value of a voltage applied to said variable impedance and in a direction which tends to cause said control voltage to change back through said predetermined value sooner than it otherwise would.

11. In an on-off system for supplying energy from a source to an energy utilization device to control a variable condition, the combination comprising means for signalling the actual value of said variable condition, an oscillator having first and second parallel resonant tanks and means for producing a D.C. voltage which in magnitude is generally proportional to the difference between the resonant frequencies of said tanks, means responsive to said signalling means for increasing or decreasing the resonant frequency of said first tank in response to increases or decreases in the actual value of said variable condition within a predetermined band of values of the latter, a relay, and a silicon controlled rectifier having an anode and a cathode connected in series with said relay to form a series circuit adapted for connection to an A.C. voltage source, said rectifier having a gate, means for applying said D.C. voltage across said gate and cathode so that said rectifier conducts and the relay picks up and drops out in response to such voltage rising above or falling below a predetermined value, means connected with said series circuit and responsive to conduction by said rectifier for increasing said D.C. voltage above the value it would otherwise have, a voltage-controlled variable capacitor connected in said second tank, a resistor-capacitor circuit, means responsive to pick-up or drop-out of said relay to discharge or charge said resistor-capacitor circuit to create an exponentially falling or rising voltage, and means for applying said latter voltage to said variable capacitor to decrease or increase the resonant frequency of said second tank.

12. In a system for supplying energy from a source to an energy utilization device to control a variable condition, the combination comprising means for sensing and signalling the actual value of the variable condition, transducer means responsive to said signalling means for creating a substantially smooth D.C. control voltage which in magnitude is generally proportional to the actual value of said variable condition within a predetermined band of values of the latter, a relay, a silicon-controlled rectifier having a cathode, anode, and gate; a series circuit adapted for connection to an A.C. source and including said anode, cathode and relay, means connecting said D.C. control voltage between said cathode and gate so that said rectifier becomes conductive and said relay is actuated when said control voltage rises above a predetermined value, means responsive to switching of said relay to turn said energy utilization device on or off, and means in said transducer connected with said series circuit and responsive to conduction by said rectifier for changing said D.C. control voltage.

13. In a controller, the combination comprising means for producing a D.C. control voltage which varies in response to changes in a controlled condition, a bi-state discriminating switching device including a silicon controlled rectifier having a cathode, anode and gate; a relay connected in series with the anode and cathode to form a series circuit adapted for connection across an A.C. voltage source, a capacitor connected in parallel with said relay, means for applying the D.C. control voltage across said gate and cathode, so that said rectifier conducts to energize said relay when the control voltage exceeds a predetermined value, and means responsive to the voltage across said capacitor when said rectifier conducts for increasing said D.C. control voltage above the value it would otherwise have.

14. In an on-off control system, the combination comprising means for signalling the value of a variable condition, a transducer including means responsive to said sensing means for producing a D.C. control voltage which varies according to changes in said variable condition, a silicon controlled rectifier having a cathode, anode, and gate; a relay connected in series with said cathode and anode to form a series circuit adapted for connection across an A.C. voltage source, a capacitor connected in parallel with said relay, means for applying said D.C. control voltage across said gate and cathode, so that said rectifier becomes conductive and a voltage appears across said capacitor to energize said relay, means in said transducer responsive to a voltage for changing the value of said D.C. control signal independently of said sensing means, and means for connecting said capacitor to said changing means for increasing said D.C. control signal when the said voltage appears across said capacitor.

15. In an on-off control system, the combination comprising an oscillator having a tuned circuit, means for varying the resonant frequency of said tuned circuit according to changes in the value of a controlled condition, said oscillator having means for producing a D.C. control voltage which varies according to the resonant frequency of said tuned circuit, a relay, a silicon controlled rectifier having a cathode, anode and gate; means connecting said anode, cathode and relay in a series circuit adapted to be connected across an A.C. source, and means for applying said D.C. control voltage between said gate and cathode, so that said rectifier becomes conductive and said relay is actuated when such voltage rises above a predetermined value, but without producing disturbing effects in said oscillator when the relay is actuated or deactuated.

16. In an on-off system for supplying energy from a source to an energy utilization device to control a variable condition, the combination comprising first means for sensing and sginalling the actual value of the variable condition, second means responsive to said first means for creating a control signal which in its magnitude is generally proportional to the actual value of said variable condition within a predetermined band of values of the latter, bi-state means switched in state in response to said control signal passing through a predetermined value for successively turning said utilization device off and on, said second means including therein a reactance element whose reactive value varies according to the changes in a control voltage applied thereacross and means responsive to variation in the reactance of said element for changing the factor of proportionality between said control signal and said actual value, a resistance-capacitance circuit, means for discharging said circuit toward a first predetermined voltage level each time said bi-state means switches to a state to turn the utilization device on, means for charging said circuit toward a second predetermined voltage level each time said bi-state means switches to a state to turn the utilization device off, and means for supplying an exponentially varying voltage from said circuit across said reactance element, so that the time proportioning of the on and off periods of the utilization device is automatically decreased as the actual value of the variable condition rises toward a predetermined desired value.

References Cited by the Examiner

UNITED STATES PATENTS

| 2,838,644 | 6/1958 | Rolfson et al. | 219—500 |
| 2,899,649 | 8/1959 | Savory | 331—65 X |

OTHER REFERENCES

Wiley: "Home Appliances—Market for Solid State." Electronics, Sept. 13, 1963, p. 14.

ROY LAKE, *Primary Examiner.*

S. H. GRIMM, *Assistant Examiner.*